US012527489B2

(12) United States Patent
Kim et al.

(10) Patent No.: US 12,527,489 B2
(45) Date of Patent: Jan. 20, 2026

(54) ELECTRONIC DEVICE FOR MEASURING BIOLOGICAL SIGNAL AND METHOD FOR OPERATION IN THE ELECTRONIC DEVICE

(71) Applicant: Samsung Electronics Co., Ltd., Suwon-si (KR)

(72) Inventors: Jungsoo Kim, Suwon-si (KR); Taesan Kim, Suwon-si (KR); Shinhun Moon, Suwon-si (KR); Jaehyuck Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 17/953,666

(22) Filed: Sep. 27, 2022

(65) Prior Publication Data

US 2023/0105768 A1 Apr. 6, 2023

Related U.S. Application Data

(63) Continuation of application No. PCT/KR2022/014375, filed on Sep. 26, 2022.

(30) Foreign Application Priority Data

Sep. 28, 2021 (KR) .................. 10-2021-0128153
Nov. 25, 2021 (KR) .................. 10-2021-0164673

(51) Int. Cl.
*A61B 5/0531* (2021.01)
*A61B 5/00* (2006.01)

(52) U.S. Cl.
CPC .......... *A61B 5/0531* (2013.01); *A61B 5/4561* (2013.01); *A61B 5/681* (2013.01);
(Continued)

(58) Field of Classification Search
CPC ..... A61B 5/0531; A61B 5/681; A61B 5/7221; A61B 5/7405; A61B 2562/04; A61B 5/053; A61B 5/0537
See application file for complete search history.

(56) References Cited

U.S. PATENT DOCUMENTS 10,555,686 B1 2/2020 Kimoto et al.
11,596,322 B2 3/2023 Jung et al.
(Continued)

FOREIGN PATENT DOCUMENTS

EP 1 525 844 B1 12/2007
JP 2007-075174 A 3/2007
(Continued)

OTHER PUBLICATIONS

International Search Report dated Jan. 11, 2023, issued in International Patent Application No. PCT/KR2022/014375.
(Continued)

*Primary Examiner* — Eric F Winakur
*Assistant Examiner* — Noah M Healy
(74) *Attorney, Agent, or Firm* — Jefferson IP Law, LLP

(57) ABSTRACT

The disclosure relates to an electronic device for measuring a bio-signal and a method for operation in the electronic device. The method includes obtaining a first impedance value, based on a first group of electrodes of the electronic device being in contact with a first portion of a human body, and a first region of a second portion of the human body being in contact with two electrodes among a second group of electrodes included in the electrode module according to a first measurement posture of a user, obtaining a second impedance value, obtaining a correction value and storing the correction value in a memory, and obtaining a corrected first impedance value by applying the correction value to the first impedance value.

17 Claims, 11 Drawing Sheets

(52) U.S. Cl.
CPC .......... *A61B 5/6844* (2013.01); *A61B 5/7221* (2013.01); *A61B 5/7405* (2013.01); *A61B 5/742* (2013.01); *A61B 2562/04* (2013.01)

(56) References Cited

U.S. PATENT DOCUMENTS

| | | | |
|---|---|---|---|
| 2005/0192511 A1* | 9/2005 | Shiokawa | A61B 5/0537 |
| | | | 600/547 |
| 2011/0134074 A1 | 6/2011 | Norieda | |
| 2014/0228666 A1 | 8/2014 | Ausin Sanchez et al. | |
| 2016/0089053 A1 | 3/2016 | Lee et al. | |
| 2016/0106337 A1* | 4/2016 | Jung | A61B 5/681 |
| | | | 600/547 |
| 2016/0128604 A1* | 5/2016 | Eom | A61B 5/681 |
| | | | 600/384 |
| 2017/0100052 A1 | 4/2017 | Jung et al. | |
| 2017/0340209 A1 | 11/2017 | Klaassen et al. | |
| 2018/0042557 A1* | 2/2018 | Park | A61B 5/6826 |
| 2018/0220923 A1 | 8/2018 | Shim et al. | |
| 2019/0072912 A1 | 3/2019 | Pandya et al. | |
| 2021/0177290 A1 | 6/2021 | Jung et al. | |
| 2021/0219864 A1 | 7/2021 | Eom et al. | |
| 2022/0071503 A1 | 3/2022 | Chang et al. | |

FOREIGN PATENT DOCUMENTS

| | | |
|---|---|---|
| KR | 10-2001-0106959 A | 12/2001 |
| KR | 10-2016-0036958 A | 4/2016 |
| KR | 10-2017-0010704 A | 2/2017 |
| KR | 10-1828068 B1 | 2/2018 |
| KR | 10-2019-0065087 A | 6/2019 |
| KR | 10-2020-0027010 A | 3/2020 |
| KR | 10-2020-0078955 A | 7/2020 |
| KR | 10-2021-0073929 A | 6/2021 |
| KR | 10-2021-0092577 A | 7/2021 |
| WO | 2010/024028 A1 | 3/2010 |
| WO | 2020/138667 A1 | 7/2020 |

OTHER PUBLICATIONS

Extended European Search Report dated Oct. 21, 2024, issued in European Application No. 22876776.0-1113.

* cited by examiner

| Measurement posture | Measurement impedance value |
|---|---|
| Posture 1 | 1400 |
| Posture 2 | 585 |
| Finger | 815 |

FIG. 10A

| Number of measurements | Impedance value after correction (error rate) |
|---|---|
| Measurement 1 | 597(2%) |
| Measurement 2 | 605(3%) |
| Measurement 3 | 585(0%) |
| Measurement 4 | 599(2%) |
| Measurement 5 | 578(1%) |
| Measurement 6 | 581(1%) |
| Measurement 7 | 571(2%) |

FIG. 10B

ELECTRONIC DEVICE FOR MEASURING BIOLOGICAL SIGNAL AND METHOD FOR OPERATION IN THE ELECTRONIC DEVICE

CROSS-REFERENCE TO RELATED APPLICATION(S)

This application is a continuation application, claiming priority under § 365 (c), of an International application No. PCT/KR2022/014375, filed on Sep. 26, 2022, which is based on and claims the benefit of a Korean patent application number 10-2021-0128153, filed on Sep. 28, 2021, in the Korean Intellectual Property Office, and of a Korean patent application number 10-2021-0164673, filed on Nov. 25, 2021, in the Korean Intellectual Property Office, the disclosure of each of which is incorporated by reference herein in its entirety.

TECHNICAL FIELD

The disclosure relates to an electronic device for measuring a biological signal and a method for operation in the electronic device.

BACKGROUND ART

Electronic devices have been developed in various forms for user convenience, and have become compact such that users can conveniently carry the same.

In line with increasing interests in health and development of various technologies for measuring and managing health statuses, various types of electronic devices have been developed to measure and utilize various biological signals of human bodies. Such electronic devices provide various services for managing the health of users or determining the health status by measuring various biological signals (for example, bio-electrical impedance analysis (BIA).

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Electronic devices for BIA measurement have been commercialized, and an electronic device for BIA measurement uses two electrodes and uses current and voltage measurement values between the electrodes, thereby detecting a path-dependent body impedance, but if no appropriate path is formed, the accuracy of the BIA is degraded, and no accurate body composition can be acquired. In addition, an electronic device for BIA measurement is formed to grip and measure two fingers (for example, thumb and forefinger) to increase the accuracy of body composition when a plurality of electrodes are used. However, an electronic device for BIA measurement may obtain an inaccurate measurement result if the user grips a finger in an unnatural posture. In addition, if the plurality of electrodes are disposed in a position such that the user can easily grip the same, the degree of freedom may decrease in connection with arranging the plurality of electrodes.

Aspects of the disclosure are to address at least the above-mentioned problems and/or disadvantages and to provide at least the advantages described below. Accordingly, an aspect of the disclosure is to provide an electronic device for measuring biological signals and a method for operation in the electronic device, wherein a convenient posture (for example, one finger) is utilized during biological signal measurement such that a degree of freedom is secured in connection with electrode arrangement, a stable measurement posture provides convenience, and measurement accuracy is maintained through periodic correction.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory, an electrode module including a first group of electrodes and a second group of electrodes, each of the electrodes being configured to be connected to a human body, and at least one processor electrically connected to the electrode module and the memory, wherein the at least one processor is configured to obtain a first impedance value, based on the first group of the electrodes being in contact with a first portion of the human body, and a first region of a second portion of the human body being in contact with two electrodes among the second group of the electrodes according to a first measurement posture of a user, obtain a second impedance value, based on the first group of the electrodes being in contact with the first portion of the human body, the first region of the second portion of the human body being in contact with at least one of the two electrodes according to a second measurement posture of the user, and a second region of the second portion being in contact with an electrode other than the two electrodes among the second group of the electrodes, obtain a correction value, based on the first impedance value or the second impedance value, and store the correction value in the memory, and obtain a corrected first impedance value by applying the correction value to the first impedance value.

In accordance with another aspect of the disclosure, a method for operation in an electronic device is provided. The method includes obtaining a first impedance value, based on a first group of electrodes included in an electrode module of the electronic device being in contact with a first portion of a human body, and a first region of a second portion of the human body being in contact with two electrodes among a second group of electrodes included the electrode module according to a first measurement posture of a user, obtaining a second impedance value, based on the first group of the electrodes being in contact with the first portion of the human body, the first region of the second portion of the human body being in contact with at least one of the two electrodes according to a second measurement posture of the user, and a second region of the second portion being in contact with an electrode other than the two electrodes among the second group of the electrodes, obtaining a correction value, based on the first impedance value or the second impedance value, and storing the correction value in a memory, and obtaining a corrected first impedance value by applying the correction value to the first impedance value.

Advantageous Effects

According to an embodiment of the disclosure, an electronic device and a method for operation in the electronic device may measure an accurate biological signal by a corrected first impedance value obtained by correcting a first impedance value in a first posture in which a first group of electrodes contact a first part of a human body, and two electrodes of a second group contact an area (for example, finger) of a second part of the human body such that a degree of freedom is secured in connection with electrode arrangement, a stable measurement posture provides convenience, and measurement accuracy is maintained through periodic correction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 10A and 10B illustrate correcting an impedance value in an electronic device according to an embodiment of the disclosure.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "user" used in various embodiments may refer to a person who uses an electronic device or a device (for example, an artificial intelligence electronic device) using the electronic device.

Figure 1:
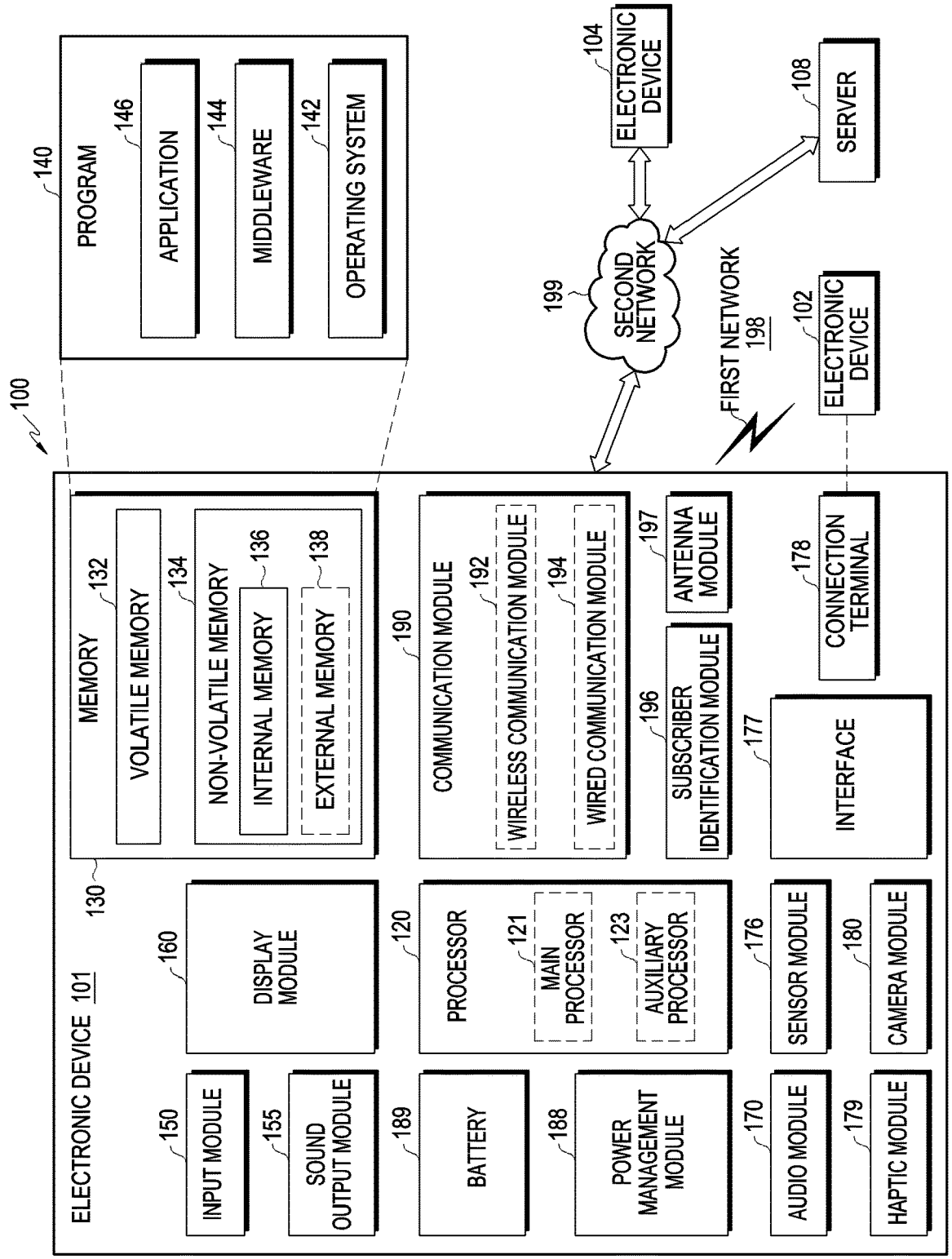
FIG. 1 is a block diagram of an electronic device in a network environment, according to various embodiments of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mm Wave antenna module. According to an embodiment of the disclosure, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
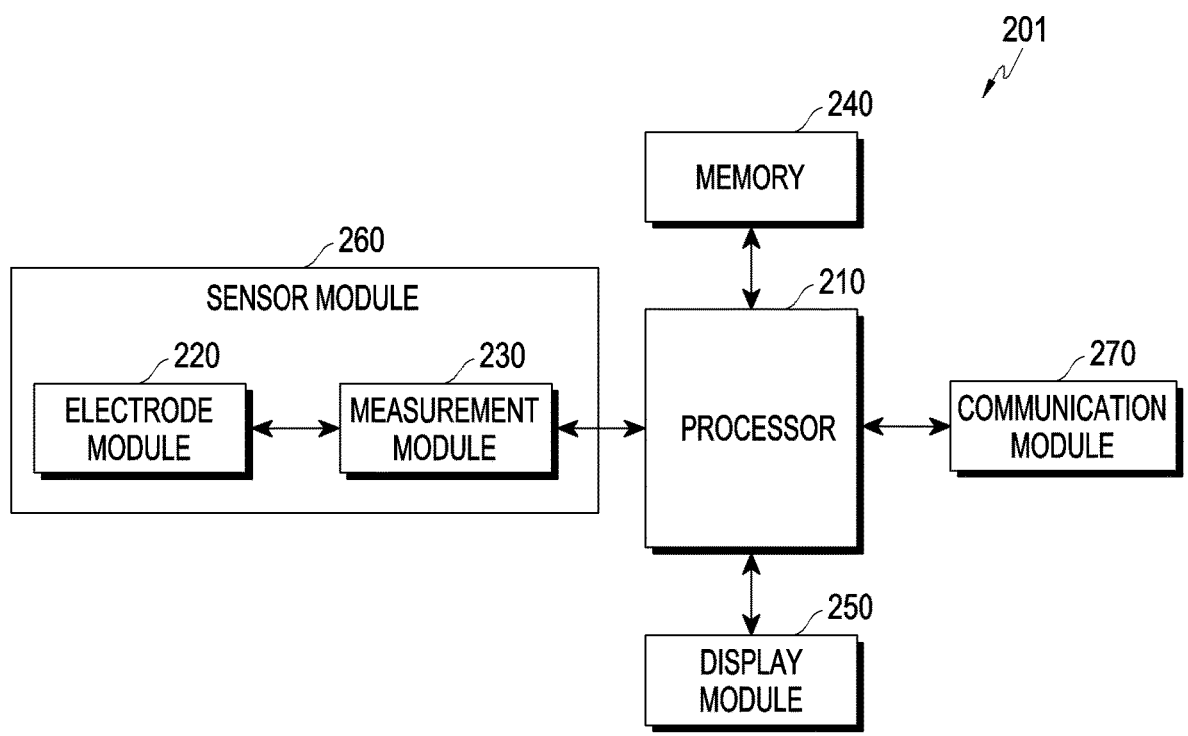
FIG. 2 is a block diagram illustrating a configuration of an electronic device according to an embodiment of the disclosure.

FIG. 2 is a block diagram illustrating a configuration of an electronic device according to an embodiment of the disclosure.

Figure 3A:
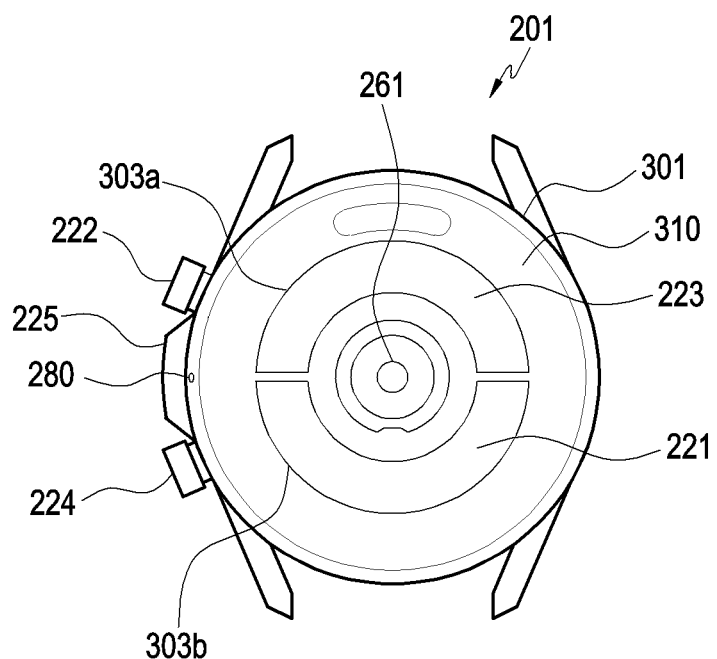
FIGS. 3A and 3B illustrate a configuration of an electronic device according to an embodiment of the disclosure.
Figure 3B:
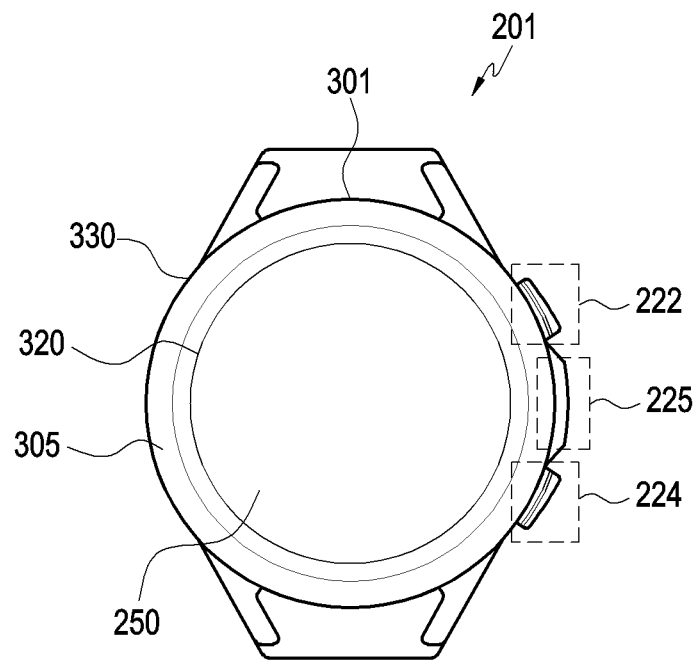

FIGS. 3A and 3B illustrate a configuration of an electronic device according to an embodiment of the disclosure.

Referring to FIG. 2, an electronic device 201 (e.g., the electronic device 101 of FIG. 1) according to an embodiment may be configured to include at least one processor 210, an electrode module 220, a measurement module 230, a memory 240, a display module 250, a sensor module 260, and a communication module 270. The electronic device 201 is not limited thereto and may be configured to further include one or more various other components (e.g., one or more other components included in the electronic device 101 of FIG. 1). The electronic device 201 may be configured without some of the components illustrated in FIG. 2.

According to an embodiment of the disclosure, the electronic device 201 may be, for example, a watch-type wearable device which can be worn on a user's wrist or a wearable device which can be worn on other parts of the human body (e.g., a forearm, head, thigh, or other parts of the human body). For another example, the electronic device 201 may be a small device or a mobile device in the form which can be placed on one hand of a user and manipulated with the other hand thereof.

Referring to FIGS. 2, 3A, and 3B, the electronic device 201 according to an embodiment may include a housing 301 including a first surface 310 (e.g., a rear surface), a second surface 320 (e.g., a front surface), and a third surface 330 (e.g., a side surface) surrounding a space between the first surface 310 (e.g., the rear surface) and the second surface 320 (e.g., the front surface). In the electronic device 201, a plurality of electrodes included in the electrode module 220 may be disposed on the first surface 310 and the third surface 330 of the housing 301, respectively. For example, a first group of electrodes (e.g., at least two electrodes) may be disposed on the first surface 310 of the housing 301, and a second group of electrodes (e.g., at least three electrodes) included in the electrode module 220 may be disposed on the third surface 330 of the housing 301. The electronic device 201 according to an embodiment may include a microphone (MIC) 280 disposed in a partial region (e.g., an adjacent region in which the second group of the electrodes is disposed) of the third surface 330.

According to an embodiment of the disclosure, as shown in FIG. 3A, the electronic device 201 may be configured such that a first electrode 221 and a third electrode 223 of the first group included in the electrode module 220 are disposed in at least two portions of first members 303a and 303b on the first surface 310 (e.g., the rear surface) which is one surface of the housing 301. The electronic device 201 may include at least one sensor 261 disposed in a shape surrounded by the first members 303a and 303b disposed on the first surface 310, so as to be in contact with or close to the skin of the human body. The at least one sensor 261 may be included in the sensor module 260. For example, the at least one sensor 261 may be a sensor capable of measuring at least one bio-signal. The sensor 261 may be, for example, a photoplethysmography (PPG) sensor module, and may include a light-emitting unit and a light-receiving unit.

According to an embodiment of the disclosure, as shown in FIG. 3B, the electronic device 201 may be configured such that a second electrode 222, a fourth electrode 224, and a fifth electrode 225 of the second group included in the electrode module 220 are disposed in at least one portion of a second member 305 formed in a shape surrounding the display module 250 disposed on the second surface 320 (e.g., the front surface) which is another surface of the housing 301.

Referring to FIGS. 2, 3A, and 3B, the at least one processor 210 according to an embodiment may be electrically connected to the electrode module 220, the measurement module 230, the memory 240, the display module 250, the sensor module 260, and the communication module 270.

According to an embodiment of the disclosure, the at least one processor 210 may output a signal (e.g., an alternating current signal) to the human body through the plurality of electrodes (e.g., the first electrode 221, the second electrode 222, the third electrode 223, the fourth electrode 224 and/or the fifth electrode 225) in specified regions of the human body, and obtain impedance values, based on a signal (e.g., a BIA voltage or a BIA current) received through the human body. For example, signal characteristics (e.g., amplitude) of a signal received by the electrode module 220 through the human body of a user may be changed by the body of the user. The at least one processor 210 may measure an impedance value of the user, based on the change in the received signal. The at least one processor 210 may obtain biometric information (e.g., body composition) of the user, based on the obtained impedance value, and obtain information related to a physical condition of the user, based on the obtained biometric information.

Figure 4A:
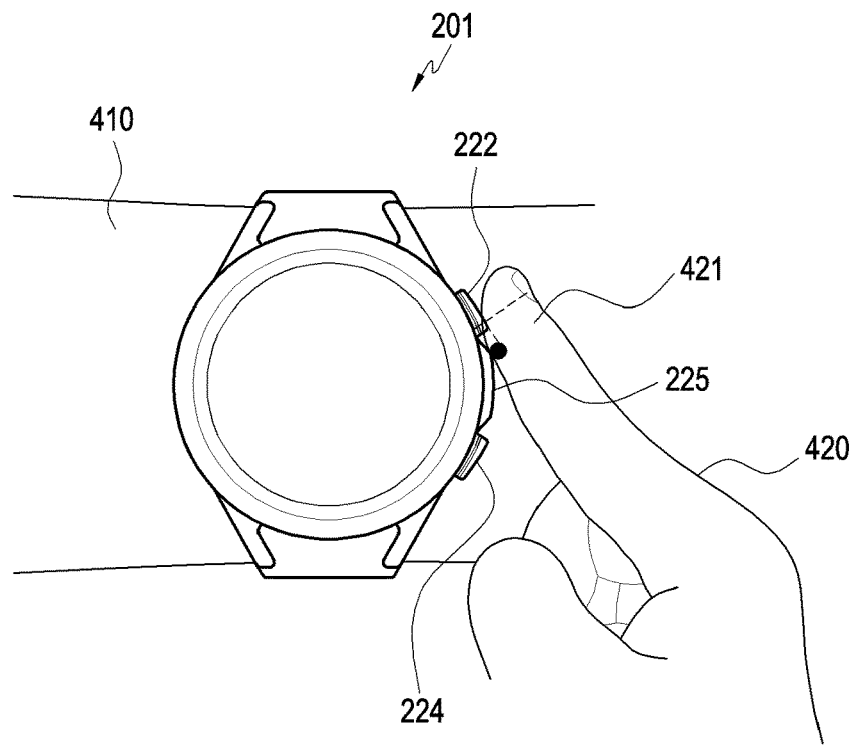
FIGS. 4A, 4B, and 4C illustrate bio-signal measurement of an electronic device according to an embodiment of the disclosure.
Figure 4B:
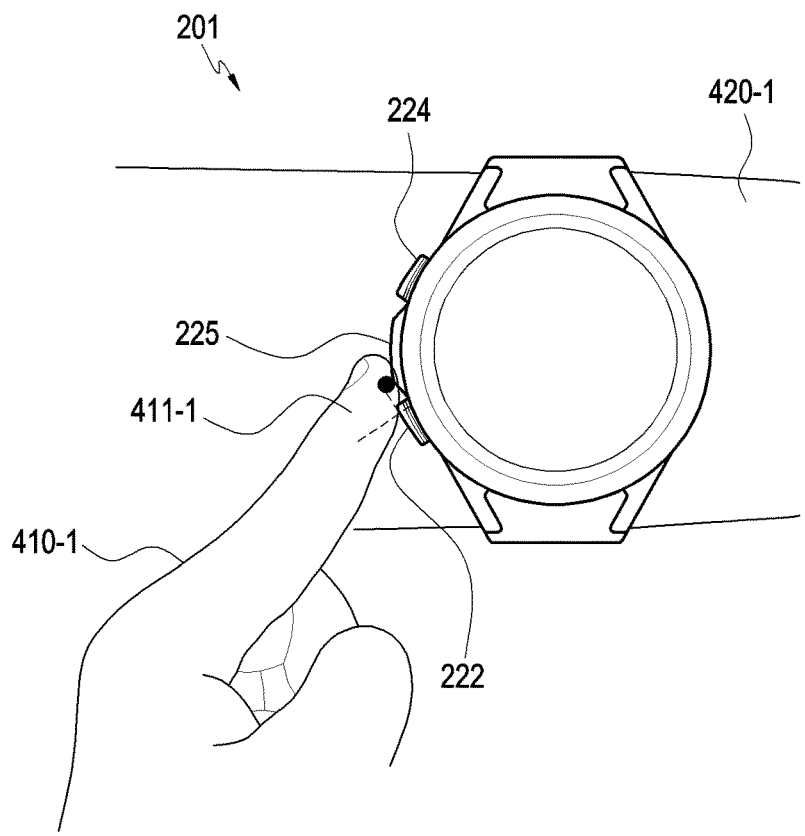
Figure 4C:
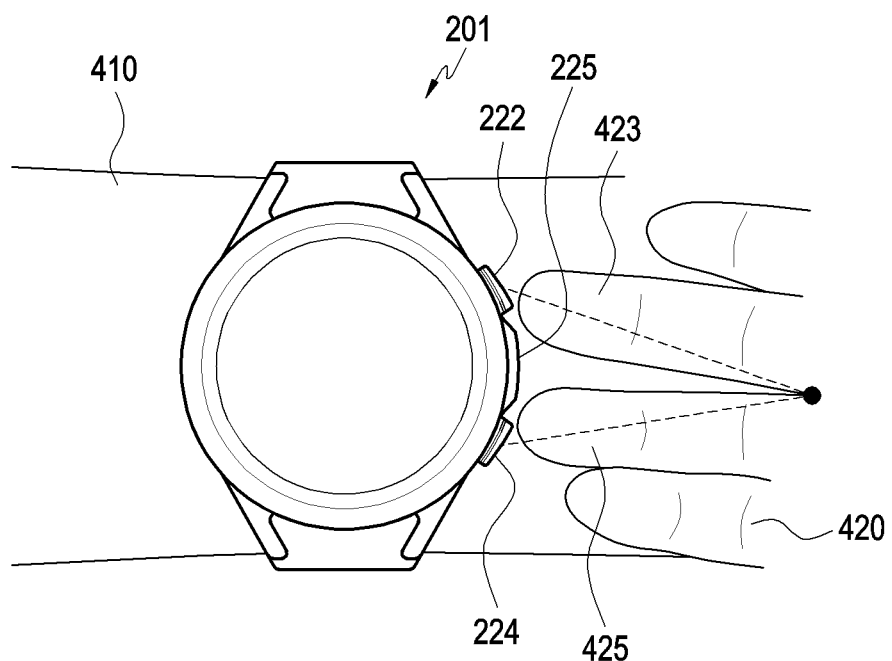

FIGS. 4A, 4B, and 4C illustrate bio-signal measurement of an electronic device according to embodiment of the disclosure.

Referring to FIG. 4A or 4B, the at least one processor 210 may identify that a first region 421 (e.g., a contact region of the right index finger) of a second portion 420 (e.g., the right hand) of the human body is in contact with two electrodes (e.g., the second electrode 222 and the fifth electrode 225) among the second group of the electrodes in a state in which the first group of the at least two electrodes (e.g., the first electrode 221 and the third electrode 223) among the plurality of electrodes included in the electrode module 220 is in contact with a first portion 410 (e.g., the left hand) of the human body. The at least one processor 210 may obtain a first impedance value according to a first measurement posture of the user, based on the first region 421 being in contact with the two electrodes (e.g., the second electrode 222 and the fifth electrode 225) among the second group of the electrodes.

Referring to FIG. 4A, the first measurement posture may represent a posture in which, in a state where the user wears the electronic device 201 on the first portion 410 (e.g., the left hand) of the human body, the first group of the electrodes (e.g., the first electrode 221 and the third electrode 223) is in contact with the first portion 410 (e.g., the left hand) of the human body, and the first region 421 (e.g., a partial region of one finger) of the second portion 420 (e.g., the right hand) of the human body is in contact with two adjacent electrodes (e.g., the second electrode 222 and the fifth electrode 225) among the second group of the electrodes.

According to an embodiment of the disclosure, the at least one processor 210 may repeatedly perform an operation for obtaining a first impedance value according to a first measurement posture periodically or according to a user's request. For example, as shown in FIG. 4A, when the user wears the electronic device 201 on the first portion 410 (e.g., the left wrist) as a right-handed user, the second electrode 222 and the fifth electrode 225 may be arranged to be adjacent to a partial region of the third surface 330 in a direction towards the left hand so as to conveniently come in contact with the first region 421 (e.g., a contact region of the index finger of the right hand) of the second portion 420 (e.g., the right hand). For another example, as shown in FIG. 4B, when the user wears the electronic device 201 on a second portion 420-1 (e.g., the right hand) of the human body of the user as a left-handed user, the second electrode 222 and the fifth electrode 225 may be arranged to be adjacent to another partial region of the third surface 330 in a direction towards the second portion 420-1 (e.g., the right hand) so as to conveniently come in contact with a first region 411-1 (e.g., a contact region of the index finger) of a first portion 410-1 (e.g., the left hand). The disclosure is not limited thereto, and the second electrode 222 and the fifth electrode 225 may be disposed adjacent to each other at different positions which are convenient to come in contact with one finger.

Referring to FIG. 4B, when the user wears the electronic device 201 on the second portion 420-1, a screen displayed on the display module 250 is displayed in the opposite direction to when the user wears the electronic device on the first portion 410 as shown in FIG. 4A, and thus the electronic device 201 may reconfigure and display the screen to be displayed in a forward direction from the user's gaze. For example, the first electrode 221 and the third electrode 223 may come in contact with the first portion 410 of the human body at substantially the same time. For example, the second electrode 222 and the fifth electrode 225 may come in contact with the first region 421 of the second portion 420 of the human body at substantially the same time.

Referring to FIG. 4C, the at least one processor 210 may obtain a second impedance value according to a second measurement posture of the user, based on a first region 423 (e.g., the first region 421 of FIG. 4A) and a second region 425 being in contact with two electrodes (e.g., the second electrode 222 and the fourth electrode 224) among the second group of the electrodes, as two specified regions of the second portion 420 (e.g., the right hand) of the human body, while the first group of the at least two electrodes (e.g., the first electrode 221 and the third electrode 223) among the plurality of electrodes included in the electrode module 220 is in contact with the first portion 410 (e.g., the left hand) of the human body. As shown in FIG. 4C, the second measurement posture may represent a posture in which, in a state where the user wears the electronic device 201 on the first portion 410 (e.g., the left hand) of the human body of the user, the first region 423 and the second region 425 of the second portion 420 (e.g., the right hand) of the human body are in contact with two electrodes (e.g., the second electrode 222 and the fourth electrode 224), respectively, among the second group of the electrodes. According to an embodiment of the disclosure, the at least one processor 210 may perform an operation for obtaining a second impedance value according to a second measurement posture, when the execution of an application (e.g., a program or a function) for measuring a bio-signal is started, when a user request is input, or when a corrected first impedance value is not identified as a valid value. For example, the second electrode 222 may come in contact with the first region 423 (e.g., the first region 421 of FIG. 4A) of the second portion 420 of the human body and the fourth electrode 224 may come in contact with the second region 425 of the second portion 420 of the human body, at substantially the same time.

According to an embodiment of the disclosure, the at least one processor 210 may perform an operation for configuring a correction value before performing an operation for correcting a first impedance value according to a first measurement posture. When the execution of an application (e.g., a program or a function) for measuring a bio-signal is started or a user request is input, the at least one processor 210 may obtain a correction value (e.g., an impedance offset value), based on a measured first impedance value according to a first measurement posture and a measured second impedance value according to a second measurement posture. The correction value may be, for example, an impedance value related to the second portion, and may be obtained based on a difference between the first impedance value and the second impedance value. The at least one processor 210 may store the correction value in the memory 240. The at least one processor 210 may obtain an impedance value (a correction value) of the first region (e.g., a contact region of the index finger of the right hand) of the second portion of the human body itself as a value obtained by subtracting the second impedance value according to the second measurement posture from the first impedance value according to the first measurement posture.

According to an embodiment of the disclosure, the at least one processor 210 may be configured to obtain, from the memory 240, a correction value obtained based on a previously detected first impedance value according to a first measurement posture and a previously detected second impedance value according to a second measurement posture of the user, and apply the correction value to correct the first impedance value according to the first measurement posture, so as to obtain a corrected first impedance value.

According to an embodiment of the disclosure, when the corrected first impedance value is not identified as a valid value, the at least one processor 210 may update a previously configured correction value, based on a measured first impedance value according to a first measurement posture and a measured second impedance value according to a second measurement posture.

According to an embodiment of the disclosure, the at least one processor 210 may control the display module 250 to display information indicating the corrected impedance value. The at least one processor 210 may control the display module 250 to display at least one of measured impedance values (e.g., a first impedance value or a second impedance value), a correction value, or biometric information obtained based on a corrected impedance value. The at least one processor 210 may control the display module 250 to display additional information (e.g., at least one of health training information, hospital information, first aid information, or information for stress relief) according to a user's physical condition or health condition obtained based on the corrected impedance value.

According to an embodiment of the disclosure, the at least one processor 210 may control a sound output module (e.g., the sound output module 155 of FIG. 1) or an audio module (e.g., the audio module 170 of FIG. 1) to output sound information or audio information indicating at least one of measured impedance values (e.g., a first impedance value or a second impedance value), a corrected impedance value, a correction value, or biometric information obtained based on the corrected impedance value. The at least one processor 210 may control the sound output module (e.g., the sound output module 155 of FIG. 1) or the audio module (e.g., the audio module 170 of FIG. 1) to output additional information (e.g., at least one of health training information, hospital information, first aid information, or information for stress relief) according to a user's physical condition or health condition obtained based on the corrected impedance value.

According to an embodiment of the disclosure, the at least one processor 210 may transmit, to an external electronic device (e.g., the electronic device 101 of FIG. 1), through the communication module 270, at least one of measured impedance values (e.g., a first impedance value or a second impedance value), a corrected impedance value, a correction value, or biometric information obtained based on the corrected impedance value. The at least one processor 210 may control the communication module 270 to transmit additional information (e.g., at least one of health training information, hospital information, first aid information, or information for stress relief) according to a user's physical condition or health condition obtained based on the corrected impedance value.

According to an embodiment of the disclosure, the at least one processor 210 may be, as a hardware module or a software module (e.g., an application program), a hardware component (function) or a software component (program) including at least one of various sensors provided in the electronic device 201, a data measurement module, an input/output interface, a module for managing a state or environment of the electronic device 201, or a communication module.

According to an embodiment of the disclosure, the at least one processor 210 may include, for example, one of hardware, software, and firmware or a combination of two or more thereof. The at least one processor 210 may omit at least a part of the above components or may be configured to further include other components for performing an image processing operation in addition to the above components.

Referring again to FIGS. 2, 3A, and 3B, the electrode module 220 according to an embodiment may include the first group of the electrodes (e.g., at least two electrodes) disposed on the first surface 310 of the housing 301, and the second group of the electrodes (e.g., at least three electrodes) disposed on the third surface 330 of the housing 301.

According to an embodiment of the disclosure, the first group of the electrodes may include the first electrode 221 and the third electrode 223 disposed on the first surface 310 of the housing 301, as shown in FIG. 3A. When a user wears the electronic device 201, the first electrode 221 and the third electrode 223 may be disposed on partial regions of the first surface 310 (e.g., the rear surface) of the electronic device 201, respectively, so as to be in contact with a first portion (e.g., a wrist) of the body of the user. For example, the first electrode 221 and the third electrode 223 of the first group may be configured in the form of a back glass electrode. Alternatively, a conductive electrode may be disposed in at least a partial region of the first surface 310 of the electronic device 201, or a laser direct structuring (LDS) pattern may be configured.

According to an embodiment of the disclosure, the second group of the electrodes may include the second electrode 222, the fourth electrode 224, and the fifth electrode 225 disposed on the third surface 330 of the housing 301, as shown in FIG. 3B. When the user wears the electronic device 201, the second electrode 222, the fourth electrode 224, and the fifth electrode 225 of the second group may be disposed on the third surface 330 of the housing 301 so as to be contactable by a second portion of the user's body without being in contact with a first portion of the user's body. The second electrode 222 and the fifth electrode 225 may be disposed adjacent to each other, and as shown in FIG. 4A, may be in contact with the first region 421 (e.g., a contact region of the index finger of the right hand) which is one region of the second portion 420 of the human body. The fourth electrode 224 may be disposed in another region of the third surface 330 such that the fifth electrode 225 is positioned between the fourth electrode 224 and the second electrode 222, and may be in contact with a second region (e.g., a contact region of the thumb of the right hand) which is another region of the second portion 420 (e.g., the right hand) of the human body. For example, the fifth electrode 225 may be disposed between the second electrode 222 and the fourth electrode 224, and may be configured in the form of a metal member (e.g., a front metal) configuring the third surface 330. For example, the second electrode 222 and the fourth electrode 224 may be configured in the form of a button (e.g., a back key and a home key) of an input module (e.g., the input module 150 of FIG. 1) which receives a command or data to be used in a component (e.g., the at least one processor 210) of the electronic device 201 from the outside (e.g., a user) of the electronic device 201. For another example, the fourth electrode 224 may be disposed on or included in the display module 250 in the form of a transparent electrode (e.g., indium tin oxide (ITO)).

Referring to FIG. 2, the measurement module 230 according to an embodiment may include at least one switch and a current circuit, and may be configured to be electrically connected to the electrode module 220 and the at least one processor 210. The measurement module 230 may be configured to, when a first switch connected to the first electrode 221 and the second electrode 222 of the at least one switch is on, apply an input current to a first path configured between the first electrode 221 and the second electrode 222 by using a current circuit, and measure an impedance, based on a resistance value between the first electrode 221 and the second electrode 222. The measurement module 230 may measure a voltage on a path between the second electrode 222 and the fifth electrode 225 according to a first measurement posture as the input current is applied. The measurement module 230 may measure a voltage on a path between the second electrode 222 and the fourth electrode 224 according to a second measurement posture as the input current is applied.

Referring to FIG. 2, the memory 240 according to an embodiment may store an application. For example, the memory 130 may store an application (a function or a program) related to bio-signal measurement, an exercise application, or a health management application. The memory 240 may store various data generated during execution of the program 140, including a program (e.g., the program 140 of FIG. 1) used for a functional operation. The memory 240 may largely include a program area 140 and a data area (not shown). The program area 140 may store related program information for driving of the electronic device 201, such as an operating system (OS) (e.g., the operating system 142 of FIG. 1) for booting the electronic device 201. The data area (not shown) may store transmitted and/or received data and generated data according to various embodiments. In addition, the memory 240 may include at least one storage medium among a flash memory, a hard disk, a multimedia card micro-type memory (e.g., a secure digital (SD) or an extreme digital (XD) memory), a RAM, and a ROM. According to an embodiment of the disclosure, the memory 240 may store electrocardiogram measurement result information and/or electrode combination information.

The display module 250 according to an embodiment may output information related to a user's physical condition according to the control of the at least one processor 210. The display module 250 may display a corrected impedance value (e.g., a corrected first impedance value), biometric information (e.g., EDA information) obtained based on the corrected impedance value, and/or information related to the user's physical condition obtained based on the biometric information. The display module 250 may display information (e.g., warning information or guidance information) related to an abnormal symptom of the user's health condition, or additional information (e.g., at least one of health training information, hospital information, first aid information, or information for stress relief) according to the user's physical condition or health condition. The display module 250 may be implemented in the form of a touch screen. When the display module 250 is implemented together with an input unit in the form of a touch screen, the display module 250 may display various pieces of information generated according to a touch operation of the user. The display module 250 according to an embodiment may include at least one of a liquid crystal display (LCD), a thin film transistor LCD (TFT-LCD), organic light-emitting diodes (OLED), a light-emitting diode (LED), an active matrix organic LED (AMOLED), a flexible display, and a 3-dimension display. In addition, some of these displays may be configured in a transparent type or a light-transmitting type such that the outside can be viewed through the displays. The displays may be configured in the form of a transparent display including a transparent OLED (TOLED). According to another embodiment of the disclosure, in addition to the display module 250, another mounted display module (for example, an extended display or a flexible display) may be further included.

The sensor module 260 (e.g., the sensor module 176 of FIG. 1) according to an embodiment may include various sensors (e.g., at least one sensor (e.g., a photoplethysmography (PPG) sensor 261) of FIG. 3A) related to bio-signal detection.

The communication module 270 according to an embodiment may communicate with an external electronic device (e.g., the external electronic device 102 or 104 of FIG. 1, the server 108 of FIG. 1, or another user's electronic device). For example, the communication module 270 may transmit a corrected impedance value and biometric information obtained based on the corrected impedance value. The communication module 270 may transmit, to the external electronic device, information (e.g., warning information or guidance information) related to an abnormal symptom of a user's health condition, or additional information (e.g., at least one of health training information, hospital information, first aid information, or information for stress relief) according to the user's physical condition or health condition. According to an embodiment of the disclosure, the communication module 270 may include a cellular module, a wireless-fidelity (Wi-Fi) module, a Bluetooth module, or a near field communication (NFC) module.

According to an embodiment of the disclosure, the electronic device 201 may further include an audio module (not shown) (e.g., the audio module 170 of FIG. 1) or a vibration module (not shown) (e.g., the haptic module 179 of FIG. 1). The audio module may output sound, and may include, for example, at least one of an audio codec, a microphone (MIC), a receiver, an earphone output (EAR_L), or a speaker. The audio module may output, as an audio signal (or a sound signal), biometric information (e.g., EDA information) obtained based on a corrected impedance value, and information related to a user's physical condition obtained based on the biometric information, information related to an abnormal symptom of the user's health condition, or additional information. For example, the vibration module may output, as vibration, biometric information (e.g., EDA information) obtained based on a corrected impedance value, and information related to a user's physical condition obtained based on the biometric information, information related to an abnormal symptom of the user's health condition, or additional information.

As described above, in an embodiment of the disclosure, the main components of the electronic device have been described via the electronic device 201 of FIG. 2. However, in various embodiments of the disclosure, not all of the components shown in FIG. 2 are essential components, and the electronic device 201 may be implemented by more components than the illustrated components, or the electronic device 201 may be implemented by fewer components than the illustrated components. In addition, positions of the main components of the electronic device 201 described via FIG. 2 may be changed according to various embodiments.

Figure 5:
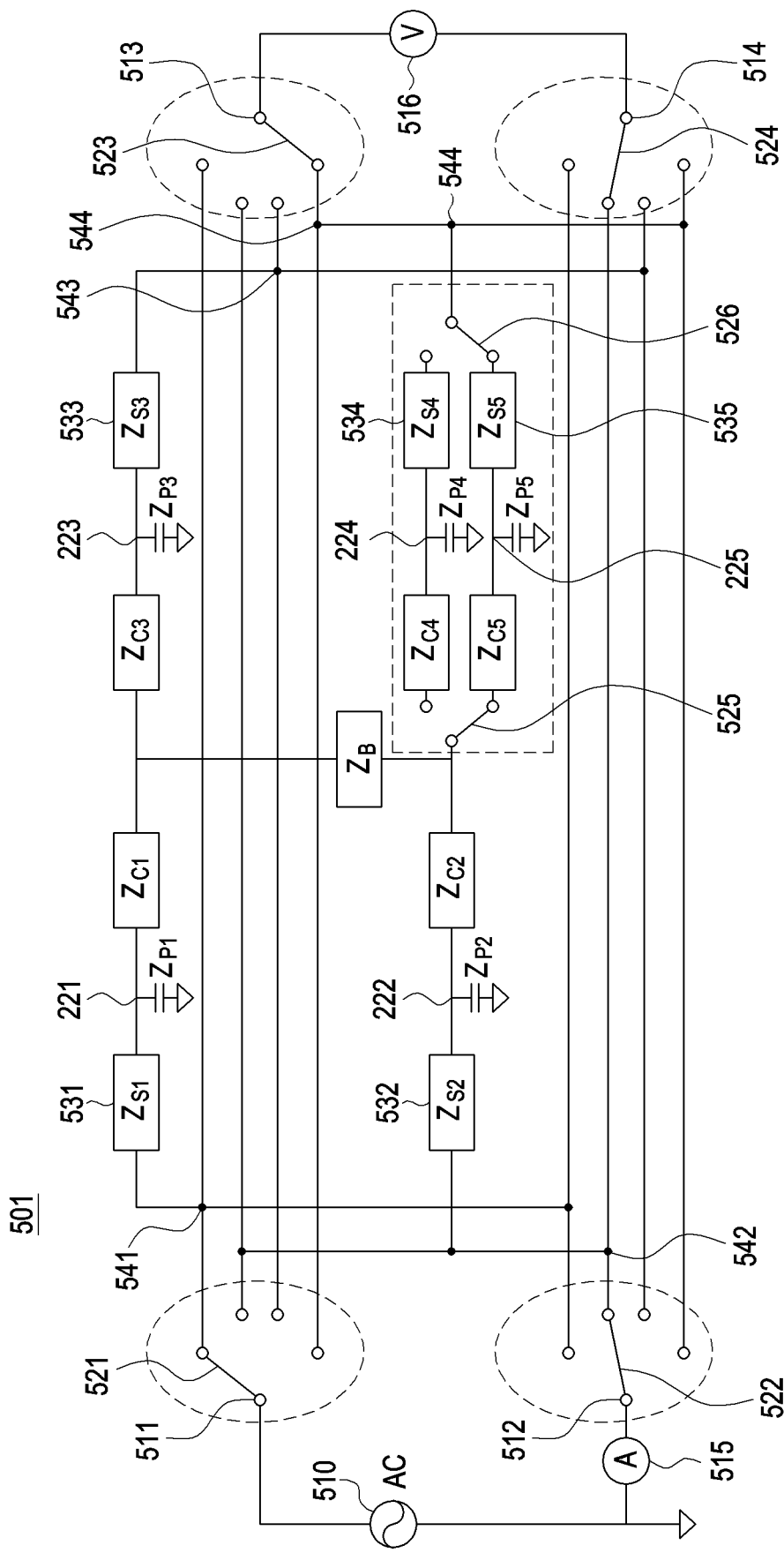
FIG. 5 is a circuit diagram illustrating a configuration of an electronic device according to an embodiment of the disclosure.

FIG. 5 is a circuit diagram illustrating a configuration of an electronic device according to an embodiment of the disclosure.

Figure 6:
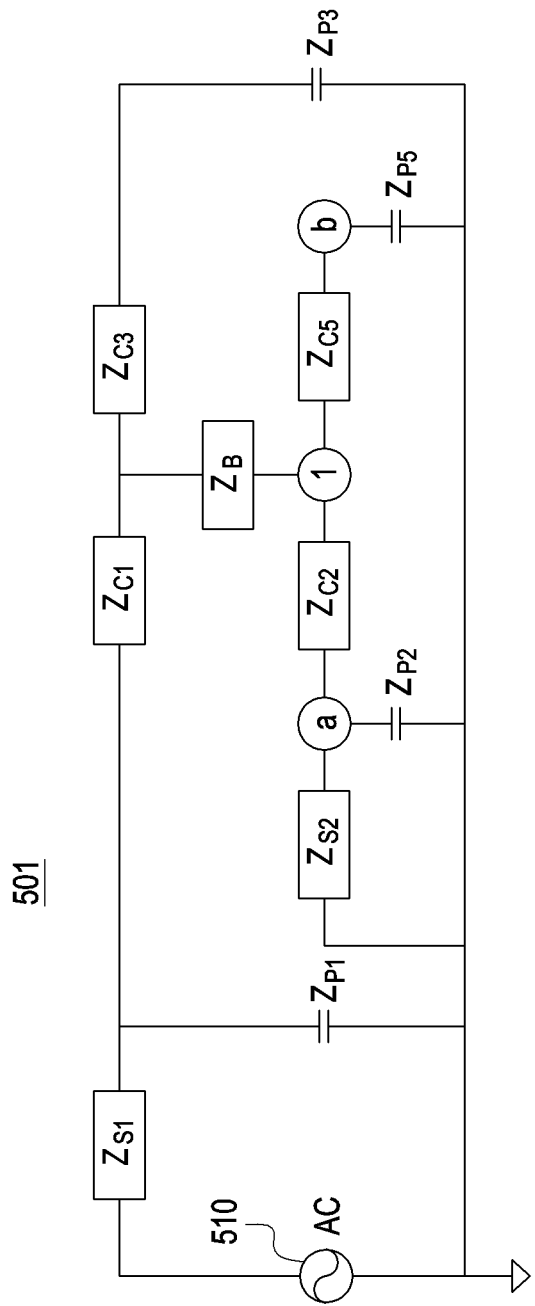
FIG. 6 is a circuit diagram illustrating a configuration of an electronic device according to an embodiment of the disclosure.

FIG. 6 is a circuit diagram illustrating a configuration of an electronic device according to an embodiment of the disclosure.

Referring to FIGS. 5 and 6, a measurement module (e.g., the measurement module 230 of FIG. 2) according to an embodiment may include a measurement circuit 501 for measuring a current and/or a voltage, and an alternating current signal generator 510. The measurement circuit 501 may include a feeding port 511, a current measurement port 512, a first voltage measurement port 513, a second voltage measurement port 514, an ammeter 515, and/or a voltmeter 516. The disclosure is not limited thereto, and the measurement module 230 may be configured to include the alternating current signal generator 510 in the measurement circuit 501.

According to an embodiment of the disclosure, the alternating current signal generator 510 may generate an electrical signal, and may apply the electrical signal to the measurement circuit 501 through the feeding port 511. The ammeter 515 may measure a current of an electrical signal received from the measurement circuit 501 through the current measurement port 512, and may transmit a current measurement value to the at least one processor 210. The first voltage measurement port 513 and the second voltage measurement port 514 may be electrically connected to the measurement circuit 501 through switches 523 and 524, connected thereto, respectively. The voltmeter 516 may measure a voltage between the first voltage measurement port 513 and the second voltage measurement port 514, and may transmit a voltage measurement value to the at least one processor 210.

According to an embodiment of the disclosure, the measurement circuit 501 may include circuit elements 531, 532, 533, 534 and 535, and the first electrode 221 may be electrically connected to a first port 541 through a first circuit element 531. The second electrode 222 may be electrically connected to a second port 542 through a second circuit element 532. The third electrode 223 may be electrically connected to a third port 543 through a third circuit element 533. The fourth electrode 224 may be electrically connected to a fourth port 544 through a fourth circuit element 534. The fifth electrode 225 may be electrically connected to the fourth port 544 through a fifth circuit element 535.

The measurement circuit 501 of the measurement module 230 according to an embodiment may include four switches 521, 522, 523, and 524. The switches 521, 522, 523, and 524 may be configured to electrically connect a plurality of electrodes (e.g., the first electrode 221, the second electrode 222, the third electrode 223, and the fourth electrode 224 or the fifth electrode 225). The measurement circuit 501 may include a switch 525 for electrically connecting the circuit elements 534 and 535 electrically connected to the fourth electrode 224 or the fifth electrode 225 to the second electrode 222, and a switch 526 for electrically connecting the circuit elements 534 and 535 electrically connected to the fourth electrode 224 or the fifth electrode 225 to the fourth port 544. Four terminals of a first switch 521 may be electrically connected to the first port 541, the second port 542, the third port 543, and the fourth port 544 of the measurement circuit 501, respectively, and the first switch 521 may connect the feeding port 511 to the first port 541 connected to the first electrode 221 among the four terminals, according to the control of the at least one processor 210. Four terminals of a second switch 522 may be electrically connected to the first port 541, the second port 542, the third port 543, and the fourth port 544 of the measurement circuit 501, respectively, and the second switch 522 may connect the current measurement port 512 to the second port 542 connected to the second electrode 222 among the four terminals, according to the control of the at least one processor 210. Four terminals of a third switch 523 may be electrically connected to the first port 541, the second port 542, the third port 543, and the fourth port 544 of the measurement circuit 501, respectively, and the third switch 523 may connect the first voltage measurement port 513 to the fourth port 544 connected to the fourth electrode 224 or the fifth electrode 225 among the four terminals, according to the control of the at least one processor 210. The third switch 523 may be connected to the fifth electrode 225 when a control signal according to a first measurement posture is received from the at least one processor 210, and may be connected to the fourth electrode 224 when a control signal according to a second measurement posture is received from the at least one processor 210. Four terminals of a fourth switch 524 may be electrically connected to the first port 541, the second port 542, the third port 543, and the fourth port 544 of the measurement circuit 501, respectively, and the third switch 523 may connect the second voltage measurement port 514 to the second port 542 connected to the second electrode 222 among the four terminals, according to the control of the at least one processor 210.

According to an embodiment of the disclosure, each of the circuit elements 531, 532, 533, 534, and 535 of the measurement circuit 501 may include electronic components (e.g., a capacitor and a resistor) for removing a direct current component from an electrical signal flowing from a corresponding port to a corresponding electrode (or vice versa). The circuit elements 531, 532, 533, 534, and 535 may have, for example, $Z_{S1}$, $Z_{S2}$, $Z_{S3}$, and $Z_{S4}$, respectively, as an impedance component given during circuit design, and such an impedance component may be referred to as a characteristic impedance Zs. An impedance component $Z_{C1}$, $Z_{C2}$, $Z_{C3}$, or $Z_{C4}$ may be generated between the human body and the respective plurality of electrodes (e.g., the first electrode 221, the second electrode 222, the third electrode 223, the fourth electrode 224, and the fifth electrode 225), and may be referred to as a contact impedance $Z_C$. The contact impedances may be changed according to a surface state (skin condition) of the human body. The contact impedances may be changed according to a frequency of the applied electrical signal. An impedance component $Z_B$ existing between the contact impedances is a component to be obtained, and $Z_B$ may be referred to as a bio-impedance. An impedance component $Z_{P1}$, $Z_{P2}$, $Z_{P3}$, or $Z_{P4}$ may be unintentionally parasitic, during circuit design, between the respective plurality of electrodes (e.g., the first electrode 221, the second electrode 222, the third electrode 223, the fourth electrode 224, and the fifth electrode 225) and the ground (e.g., the ground of the electronic device 201), and may be referred to as a parasitic impedance Zp. An electrical signal (e.g., a current and/or a voltage) may leak from the measurement circuit 501 toward the ground due to a parasitic component, and as a result, an error in a bio-impedance to be obtained may occur due to the leakage of the electrical signal. A value of the parasitic impedance may be obtained through an impedance analysis device.

According to an embodiment of the disclosure, the measurement circuit 501 may electrically connect ports 541, 542, 543, and 544 connected to the respective electrodes (e.g., the first electrode 221, the second electrode 222, the third electrode 223, the fourth electrode 224, and the fifth electrode 225), based on the control of the at least one processor 210. The at least one processor 210 may control to form a current path from one of the electrodes 221, 222, 223, 224, and 225 to another one. The at least one processor 210 may control to form a voltage path from one of the electrodes 221, 222, 223, 224, and 225 to another one.

According to an embodiment of the disclosure, the electronic device 201 may configure various current-voltage paths generated via input/output port switching of a current and a voltage in the measurement circuit 501, and calculate a final bio-impedance by calculating a characteristic impedance Zs, a parasitic impedance Zp, or a contact impedance Zc through various configured current-voltage paths, so as to perform an operation for measuring a bio-signal.

According to an embodiment of the disclosure, each of the circuit elements 534 and 535 electrically connected to the fourth electrode 224 and the fifth electrode 225 of the measurement circuit 501 may operate independently. When a control signal for measurement according to a first measurement posture is received from the at least one processor 210, in the measurement circuit 501, the second electrode 222 and the fifth electrode 225 may be electrically connected through the switches 525 and 526 to configure a first current-voltage path according to the first measurement posture. The at least one processor 210 may receive a current and/or voltage value measured in the first current-voltage path, and obtain a characteristic impedance Zs, a parasitic impedance Zp, and a contact impedance Zc calculated based on the received current and/or voltage value. In an embodiment of the disclosure, the at least one processor 210 may obtain a first impedance value according to the first measurement posture, as a final bio-impedance, based on the calculated characteristic impedance Zs, parasitic impedance Zp, and contact impedance Zc.

According to an embodiment of the disclosure, when a control signal for measurement according to a second measurement posture is received from the at least one processor 210, in the measurement circuit 501, the second electrode 222 and the fourth electrode 224 may be electrically connected through the switches 525 and 526 to configure a second current-voltage path according to the second measurement posture. The at least one processor 210 may receive a current and/or voltage value measured in the second current-voltage path from the measurement circuit 501, and obtain a characteristic impedance Zs, a parasitic impedance Zp, and a contact impedance Zc calculated based on the received current and/or voltage value. The at least one processor 210 may obtain a second impedance value according to the second measurement posture, as a final bio-impedance, based on the calculated characteristic impedance Zs, parasitic impedance Zp, and contact impedance Zc.

According to an embodiment of the disclosure, the at least one processor 210 of the electronic device 201 may identify a human body contact according to a first measurement posture in which the second group of the electrodes (e.g., the second electrode 222 and the fifth electrode 225) is in contact with the second portion 420 of the human body. When the human body contact according to the first measurement posture is identified, the measurement circuit 501 may electrically connect the first switch 521 to the first electrode 221 included in the first group, and electrically connect the second switch 522 to the second electrode 222 included in the second group, according to the control of the at least one processor 210. The measurement circuit 501 may electrically connect the third switch 523 to the fifth electrode 225, and electrically connect the fourth switch 524 to the second electrode 222, based on the first region 421 of the second portion 420 of the human body being in contact with the second electrode 222 and the fifth electrode 225 of the second group, according to the control of the at least one processor 210. The at least one processor 210 may control the alternating current signal generator 510 to apply an input current to the first electrode 221 included in the first group. The at least one processor 210 may control the measurement module 230 so as to measure a current value on a path between the first electrode 221 and the second electrode 222 and to measure a voltage value on a path between the second electrode 222 and the fifth electrode 225, and obtain a first impedance value by using at least one of the measured current value or the measured voltage value.

According to an embodiment of the disclosure, the at least one processor 210 of the electronic device 201 may identify a human body contact according to a second measurement posture in which the second group of the electrodes (e.g., the second electrode 222 and the fourth electrode 224) is in contact with the second portion 420 of the human body. When the human body contact according to the second measurement posture is identified, the measurement circuit 501 may electrically connect the first switch 521 to the first electrode 221 included in the first group, and electrically connect the second switch 522 to the second electrode 222 included in the second group, according to the control of the at least one processor 210. The measurement circuit 501 may electrically connect the third switch 523 to the fourth electrode 224, and electrically connect the fourth switch 524 to the second electrode 222, based on the second region 425 and the first region 421 or 423 of the second portion 420 of the human body being in contact with the second electrode 222 and the fourth electrode 224 of the second group, according to the control of the at least one processor 210. The at least one processor 210 may control the alternating current signal generator 510 to apply an input current to the first electrode 221 included in the first group. The at least one processor 210 may control the measurement module 230 so as to measure a current value on a path between the first electrode 221 and the second electrode 222 and to measure a voltage value on a path between the second electrode 222 and the fourth electrode 224, and obtain a second impedance value by using at least one of the measured current value or the measured voltage value.

According to an embodiment of the disclosure, an electronic device (e.g., the electronic device 101 of FIG. 1 or the electronic device 201 of FIG. 2) may include a memory (e.g., the memory 130 of FIG. 1 or the memory 240 of FIG. 2), an electrode module (e.g., the electrode module 220 of FIG. 2) including a first group of electrodes (e.g., the electrodes 221 and 223 of FIG. 3A) and a second group of electrodes (e.g., the electrodes 222, 224, and 225 of FIGS. 3A to 4C), each of the electrodes being configured to be connected to a human body, and at least one processor (e.g., the processor 120 of FIG. 1 or the at least one processor 210 of FIG. 2) electrically connected to the electrode module and the memory, wherein the at least one processor is configured to obtain a first impedance value, based on the first group of the electrodes being in contact with a first portion (e.g., the first portion 410 of FIG. 4A or the second portion 420-1 of FIG. 4B) of the human body, and a first region (e.g., the first region 421 of FIG. 4A or the first region 411-1 of FIG. 4B) of a second portion (e.g., the second portion 420 of FIG. 4A or the first portion 410-1 of FIG. 4B) of the human body being in contact with two electrodes (e.g., the electrodes 222 and 225 of FIGS. 3A to 4C) among the second group of the electrodes according to a first measurement posture (e.g., the first measurement posture of FIG. 4A or 4B) of a user, obtain a second impedance value, based on the first group of the electrodes being in contact with the first portion of the human body, the first region of the second portion of the human body being in contact with at least one of the two electrodes according to a second measurement posture (e.g., the second measurement posture of FIG. 4C) of the user, and a second region of the second portion being in contact with an electrode other than the two electrodes among the second group of the electrodes, obtain a correction value, based on the first impedance value and the second impedance value, store the correction value in the memory, and obtain a corrected first impedance value by applying the correction value to the first impedance value.

According to an embodiment of the disclosure, the first group of the electrodes may include at least two electrodes disposed on one surface of a housing of the electronic device, the second group of the electrodes may include three electrodes disposed on another surface of the housing, and the two electrodes in contact with the first region among the second group of the electrodes may be disposed adjacent to each other on the other surface of the housing.

According to an embodiment of the disclosure, the at least one processor may be further configured to obtain a first impedance value measured at a next measurement time point according to the first measurement posture, and obtain a corrected first impedance value at the next measurement time point by applying the stored correction value to the first impedance value measured at the next measurement time point, and the correction value may be an impedance value related to the second portion, and may be obtained based on a difference between the first impedance value and the second impedance value.

According to an embodiment of the disclosure, the at least one processor may be configured to obtain an error rate between the corrected first impedance value and the correction value, and identify the corrected first impedance value as a valid value when the error rate is equal to or less than a specified threshold value.

According to an embodiment of the disclosure, the at least one processor may be configured to identify the corrected first impedance value as an invalid value, when the error rate exceeds the specified threshold value, and update the correction value, based on a first impedance value according to the first measurement posture and a second impedance value according to the second measurement posture, the values being obtained at a time point at which the error rate exceeds the specified threshold value.

According to an embodiment of the disclosure, the electronic device may further include a display module (e.g., the display module 160 of FIG. 1 or the display module 250 of FIG. 2) electrically connected to the at least one processor, and the at least one processor may be configured to control the display module to display the corrected first impedance value.

According to an embodiment of the disclosure, the electronic device may further include an audio module (e.g., the audio module 170 of FIG. 1) electrically connected to the at least one processor, and the at least one processor may be configured to control the audio module to output information indicating the corrected first impedance value.

According to an embodiment of the disclosure, the electronic device may further include a measurement module (e.g., the measurement module 230 of FIG. 2) electrically connected to the at least one processor and the electrode module.

According to an embodiment of the disclosure, the at least one processor may be configured to identify the human body contact according to the first measurement posture, control the measurement module, based on the first group of the electrodes being in contact with the first portion of the human body, so as to electrically connect a first switch (e.g., the first switch 521 of FIG. 5) of the measurement module to a first electrode (a first electrode (221) of FIG. 3A or 5) included in the first group, and to electrically connect a second switch (e.g., the second switch 522 of FIG. 5) of the measurement module to a second electrode (a second electrode (222) of FIG. 3A, 3B, 4A, 4B, 4C or 5) included in the second group, control the measurement module, based on the first region of the second portion of the human body being in contact with the second electrode and a fifth electrode (a fifth electrode (225) of FIG. 3A, 3B, 4A, 4B, 4C or 5) of the second group, so as to electrically connect a third switch (e.g., the first switch 523 of FIG. 5) of the measurement module to the fifth electrode, and to electrically connect a fourth switch (e.g., the fourth switch 524 of FIG. 5) of the measurement module to the second electrode, control the measurement module so as to apply an input current to the first electrode included in the first group, measure a current value on a path between the first electrode and the second electrode, measure a voltage value on a path between the second electrode and the fifth electrode, and obtain the first impedance value by using at least one of the measured current value or the measured voltage value.

According to an embodiment of the disclosure, the at least one processor may be configured to identify the human body contact according to the second measurement posture, control the measurement module, based on the first group of the electrodes being in contact with the first portion of the human body, so as to electrically connect the first switch of the measurement module of the electronic device to the first electrode included in the first group, and to electrically connect the second switch of the measurement module to the second electrode included in the second group, control the measurement module, based on the first region of the second portion of the human body being in contact with the second electrode, and the second region being in contact with a fourth electrode (a fourth electrode (224) of FIG. 3A, 3B, 4A, 4B, 4C or 5) of the second group, so as to electrically connect the third switch of the measurement module to the fourth electrode, and to electrically connect the fourth switch of the measurement module to the second electrode, control the measurement module so as to apply an input current to the first electrode included in the first group, measure a current value on a path between the first electrode and the second electrode, measure a voltage value on a path between the second electrode and the fourth electrode, and obtain the second impedance value by using at least one of the measured current value or the measured voltage value.

According to an embodiment of the disclosure, an electronic device may include a first group of electrodes and a second group of electrodes, each of the electrodes being configured to be connected to a human body, and at least one processor electrically connected to the electrodes, wherein the at least one processor is configured to obtain a first impedance value, based on the first group of the electrodes being in contact with a first portion of the human body, and a second portion of the human body being in contact with two electrodes (e.g., adjacently disposed electrodes, the second electrode 222 and the fifth electrode 225) of a first combination among the second group of the electrodes according to a first measurement posture of a user, obtain a second impedance value, based on the first group of the electrodes being in contact with the first portion of the human body, and the second portion of the human body being in contact with two electrodes (e.g., electrodes spaced apart from each other, the second electrode 222 and the fourth electrode 224) of a second combination of the second group according to a second measurement posture of the user, obtain a correction value, based on the first impedance value and/or the second impedance value, and obtain a bio-signal, based on the first impedance value and/or the second impedance value and the correction value.

Figure 7:
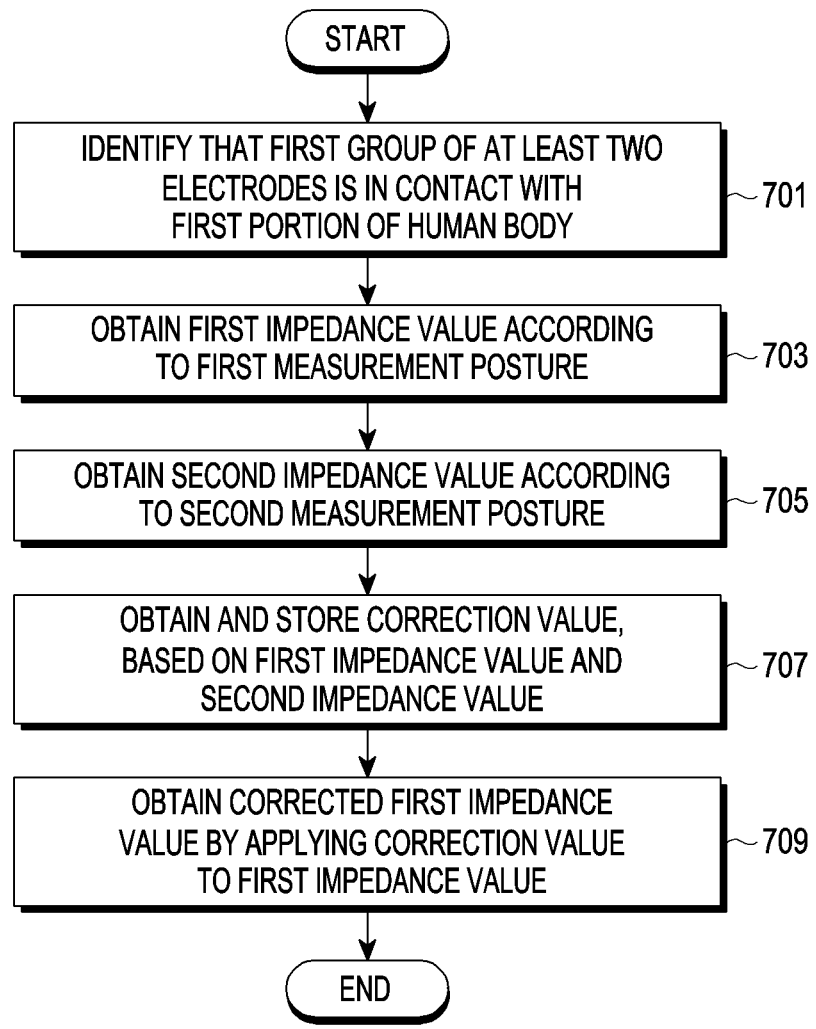
FIG. 7 is a flowchart illustrating an operation method of an electronic device according to an embodiment of the disclosure.

FIG. 7 is a flowchart illustrating an operation method of an electronic device according to an embodiment of the disclosure.

Referring to FIG. 7, in operation 701, an electronic device (e.g., the electronic device 101 of FIG. 1 or the electronic device 201 of FIG. 2) according to an embodiment may identify that a first group of at least two electrodes (e.g., the first electrode 221 and the third electrode 223 of FIG. 3A) is in contact with a first portion (e.g., the first portion 410 of FIG. 4A, the second portion 420-1 of FIG. 4B, or the first portion 410 of FIG. 4C) of a human body.

In operation 703, the electronic device may obtain a first impedance value according to a first measurement posture of a user, based on one region (e.g., the first region 421 of FIG. 4A or the first region 411-1 of FIG. 4B) of a second portion (e.g., the second portion 420 of FIG. 4A or 4C) of the human body being in contact with two electrodes (e.g., the second electrode 222 and the fifth electrode 225 of FIG. 3A, 3B, 4A, 4B, or 4C) among a second group of electrodes in a state in which the first group of the at least two electrodes is in contact with the first portion of the human body. Among the second group of the electrodes, two electrodes (e.g., the second electrode 222 and the fifth electrode 225 of FIG. 3A, 3B, 4A, 4B, or 4C) in contact with one region of the second portion of the human body may be disposed adjacent to each other on another surface (e.g., the side surface) of a housing of the electronic device.

In operation 705, the electronic device may obtain a second impedance value according to a second measurement posture of the user, based on two regions (e.g., the first region 421 of FIG. 4A or the second region 423 and the third region 425 of FIG. 4C, or the first region 411-1 and another region (e.g., a contact region of another finger) of the first portion 410-1 of FIG. 4B) of the second portion (e.g., the second portion 420 of FIG. 4C or the first portion 410-1 of FIG. 4B) of the human body being in contact with two electrodes (e.g., the second electrode 222 and the fourth electrode 224 of FIG. 3A, 3B, 4A, 4B, or 4C) among the second group of the electrodes, respectively, in a state in which the first group of the at least two electrodes is in contact with the first portion of the human body. One (e.g., the second electrode 222) of the two electrodes, with which the two regions of the second portion are in contact, respectively, may be the same electrode as one (e.g., the second electrode 222) of the two electrodes with which the one region of the second portion is in contact according to the first measurement posture. The other one (e.g., the fourth electrode 224) of the two electrodes, with which the two regions of the second portion are in contact, respectively, may be an electrode different from the other one (e.g., the fifth electrode 225) of the two electrodes with which the one region of the second portion is in contact according to the first measurement posture.

In operation 707, the electronic device may obtain a correction value (an impedance offset value), based on the first impedance value according to the first measurement posture and the second impedance value according to the second measurement posture, and store the obtained correction value in a memory (e.g., the memory 130 of FIG. 1 or the memory 240 of FIG. 2).

In operation 709, the electronic device may obtain a corrected first impedance value by applying the correction value to the first impedance value.

According to an embodiment of the disclosure, periodically or when a user request input is received according to the first measurement posture, the electronic device may repeatedly perform an operation of obtaining and correcting a first impedance value. The electronic device may obtain and store a corrected first impedance value by applying the stored correction value to a first impedance value obtained at the next measurement time point. The electronic device may display information corresponding to the corrected first impedance value on a display module (e.g., the display module 160 of FIG. 1 or the display module 250 of FIG. 2).

Figure 8:
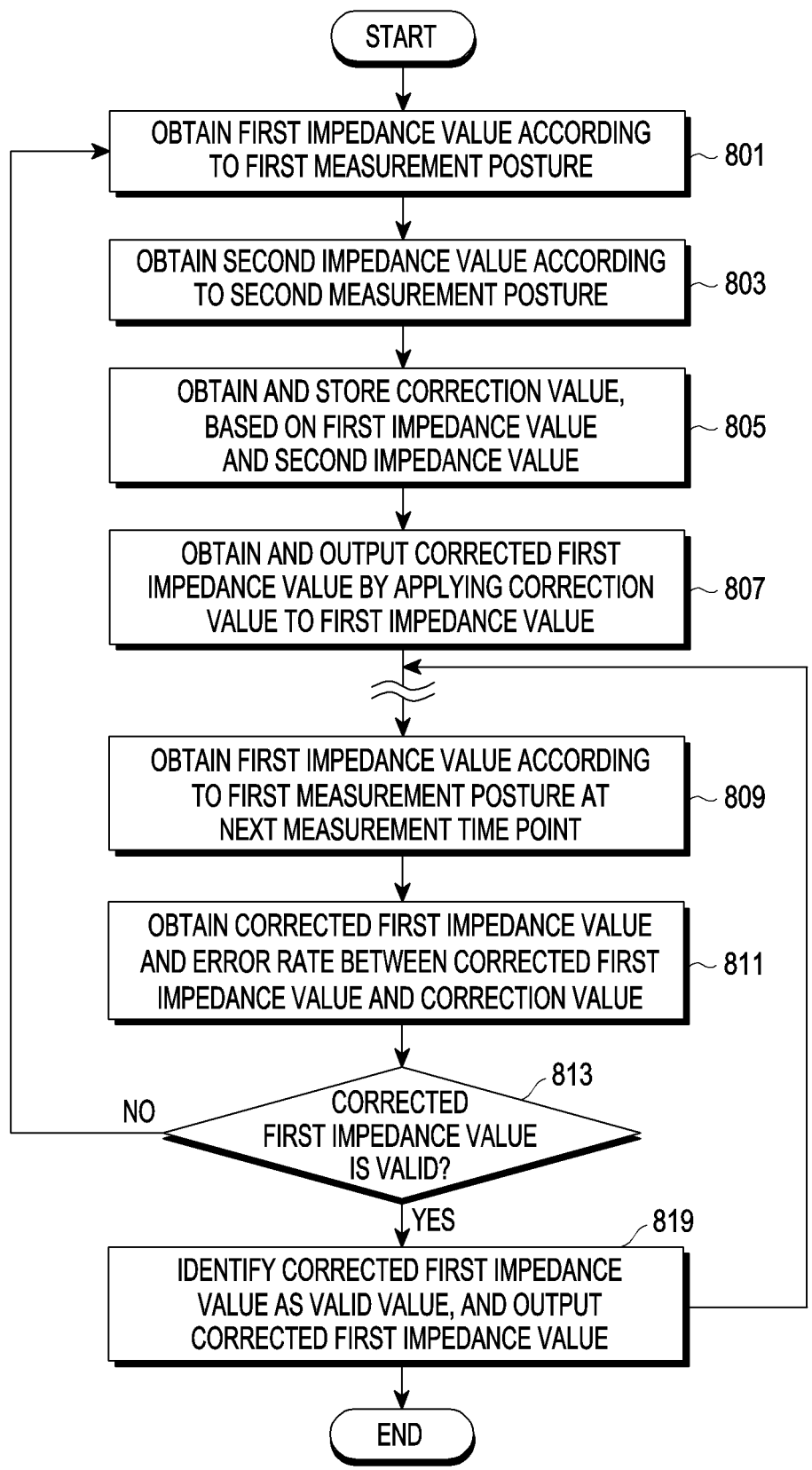
FIG. 8 is a flowchart illustrating an operation method of an electronic device according to an embodiment of the disclosure.

FIG. 8 is a flowchart illustrating an operation method of an electronic device according to an embodiment of the disclosure.

Figure 9:
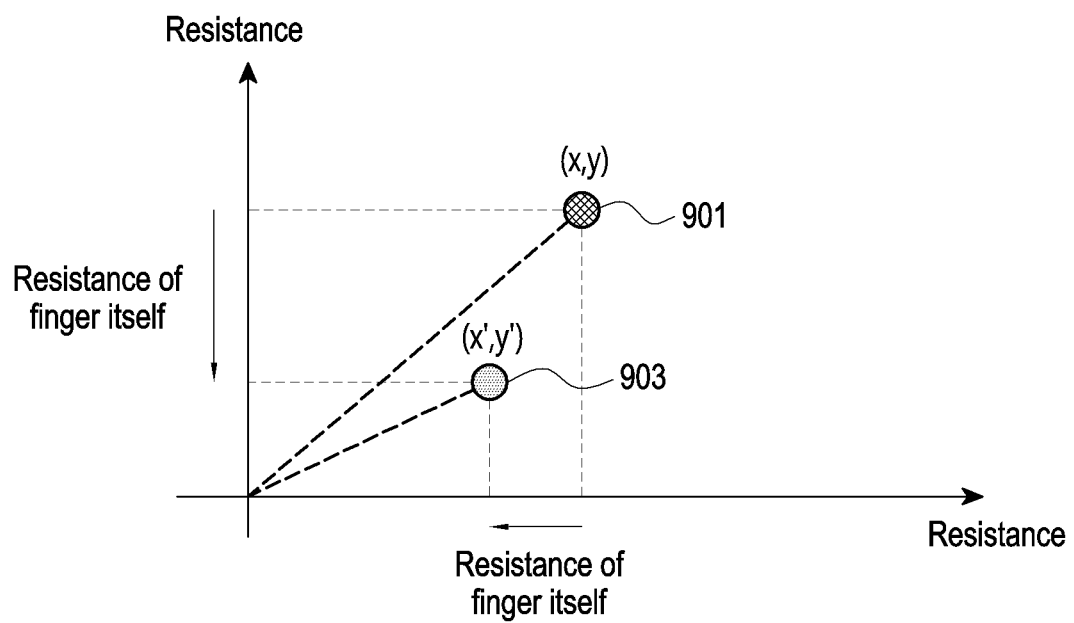
FIG. 9 illustrates correcting an impedance value in an electronic device according to an embodiment of the disclosure.

FIG. 9 illustrates correcting an impedance value in an electronic device according to an embodiment of the disclosure.

FIGS. 10A and 10B illustrate correcting an impedance value in an electronic device according to an embodiment of the disclosure.

Referring to FIGS. 8, 9, 10A and 10B, in operation 801, an electronic device (e.g., the electronic device 101 of FIG. 1 or the electronic device 201 of FIG. 2) according to an embodiment may execute an application related to bio-signal measurement, and when the application is started, obtain a first impedance value according to a first measurement posture of a user in a state in which a first group of at least two electrodes (e.g., the first electrode 221 and the third electrode 223 of FIG. 3A) is in contact with a first portion (e.g., the first portion 410 of FIG. 4A or 4C or the second portion 420-1 of FIG. 4B) of a human body. The first measurement posture may be a posture in which one region (e.g., the first region 421 of FIG. 4A or 4C or the region 411-1 of FIG. 4B) of a second portion (e.g., the second portion 420 of FIG. 4A or 4C or the first portion 410-1 of FIG. 4B) of the human body is in contact with two electrodes (e.g., the second electrode 222 and the fifth electrode 225 of FIG. 3A, 3B, 4A, 4B, or 4C) among a second group of electrodes in a state in which the first group of the at least two electrodes is in contact with the first portion of the human body. Among the second group of the electrodes, the two electrodes (e.g., the second electrode 222 and the fifth electrode 225 of FIG. 3A, 3B, 4A, 4B, or 4C) in contact with the one region may be disposed adjacent to each other on another surface (e.g., the side surface) of a housing of the electronic device.

In operation 803, the electronic device may obtain a second impedance value according to a second measurement posture of the user. The second measurement posture may be a posture in which a first region (e.g., the first region 421 of FIG. 4A or the first region 423 of FIG. 4C) and a second region 425 of a second portion (e.g., the second portion 420 of FIG. 4A, 4B, or 4C) of the human body, or one region 411-1 and another region (e.g., a contact region of another finger) of the first portion 410-1 of FIG. 4B are in contact with two electrodes (e.g., the second electrode 222 and the fourth electrode 224 of FIG. 3A, 3B, 4A, 4B, or 4C) among the second group of the electrodes, respectively, in a state in which the first group of the at least two electrodes is in contact with the first portion of the human body. One (e.g., the second electrode 222) of the two electrodes, with which the two regions of the second portion are in contact, respectively, may be the same electrode as one (e.g., the second electrode 222) of the two electrodes with which the one region of the second portion is in contact according to the first measurement posture. The other one (e.g., the fourth electrode 224) of the two electrodes, with which the two regions of the second portion are in contact, respectively, may be an electrode different from the other one (e.g., the fifth electrode 225) of the two electrodes with which the one region of the second portion is in contact according to the first measurement posture.

In operation 805, the electronic device may obtain a correction value (an impedance offset value), based on the first impedance value according to the first measurement posture and the second impedance value according to the second measurement posture, and store the obtained correction value in a memory (e.g., the memory 130 of FIG. 1 or the memory 240 of FIG. 2). For example, as shown in FIG. 9, the first impedance value is, as an impedance value (kHz) 901 of one region (e.g., a contact region of one finger of the right hand) of the second portion (e.g., the right hand), similar to the magnitude of an impedance of the user's entire upper body. Therefore, since the first measurement posture according to the first region (e.g., a contact region of one finger) is convenient, but an error of a body composition measurement value is large, the electronic device may obtain a corrected first impedance value (kHz) 903 by reducing a correction value (e.g., an inductive resistance and a resistance value of an actual finger itself) in order to reduce the error.

Referring to FIG. 10A, when the electronic device obtains the first impedance value (e.g., 1400) according to the first measurement posture, and obtains the second impedance value (e.g., 585) according to the second measurement posture, the electronic device may obtain an impedance value (e.g., 815) of one region (e.g., a contact region of one finger of the left hand) itself of the first portion (e.g., the left hand) by subtracting the second impedance value (e.g., 585) from the first impedance value (e.g., 1400). The electronic device may configure the impedance value (e.g., 815) of the one region itself of the first portion as a correction value, and store the configured correction value in the memory.

In operation 807, the electronic device may obtain the corrected first impedance value by applying the stored correction value to the first impedance value obtained at a measurement time point according to the first measurement posture. For example, the electronic device may display information indicating the corrected first impedance value on a display module (e.g., the display module 160 of FIG. 1 or the display module 250 of FIG. 2), and/or output the information through an audio module (or a sound output module) (e.g., the audio module 170 of FIG. 1). For example, the electronic device may apply the correction value (e.g., 815) stored in the memory to the first impedance value (e.g., 1400) measured at the initial measurement time point, so as to obtain a corrected first impedance value (e.g., 585). For example, as shown in FIG. 10A, the electronic device may configure the first impedance value, the second impedance value, and the correction value measured at the initial measurement time point in a table form, and store the same in the memory. The electronic device may update values included in the stored table, based on the first impedance value, the second impedance value, and the correction value obtained at an update time point.

In operation 809, periodically or when a user request input is received, the electronic device may obtain a first impedance value according to the first measurement posture at the next measurement time point, and obtain a corrected first impedance value by applying the correction value to the obtained first impedance value. For example, the electronic device may display information indicating the corrected first impedance value on the display module, and/or output the information through the audio module (or sound output module).

Referring to FIG. 10B, the electronic device may measure a first impedance value according to a first measurement posture periodically or whenever a user request input is received, and obtain a corrected first impedance value by applying a correction value to the measured first impedance value.

For example, as shown in FIG. 10B, the electronic device may apply the correction value (e.g., 815) stored in the memory to a first impedance value (e.g., 1412) measured at a first measurement time point, so as to obtain a corrected first impedance value (e.g., 597).

As shown in FIG. 10B, the electronic device may also correct first impedance values measured at the following measurement time points (a second measurement time point to a seventh measurement time point), respectively, by applying the correction value to the first impedance values.

In operation 811, the electronic device may identify a corrected first impedance value and an error rate of the corrected first impedance value. For example, as shown in FIG. 10B, the electronic device may identify an error rate for each corrected first impedance value at each measurement time point. For example, as shown in FIG. 10B, the electronic device may compare the corrected first impedance value (e.g., 597) at the first measurement time point (measurement 1) with the corrected first impedance value (e.g., 585) at the initial measurement time point, so as to obtain the error rate (e.g., 2%). For another example, the electronic device may obtain an error rate at each of the following measurement time points (the second measurement time point to the seventh measurement time point). For example, as shown in FIGS. 10A and 10B, the electronic device may configure a corrected impedance value and an error rate obtained at each measurement time point in a table form, and store the same in a memory (e.g., the memory 130 of FIG. 1 or the memory 240 of FIG. 2).

In operation 813, the electronic device may determine whether the corrected first impedance value is valid, based on the error rate. As a result of the determination, if it is determined that the corrected first impedance value is valid, the electronic device may perform operation 813. As a result of the determination, if it is determined that the corrected first impedance value is invalid, the electronic device may perform operation 801. For example, the electronic device may identify a corrected first impedance value as a valid value when the error rate is equal to or less than a specified threshold value (e.g., 5%), identify the corrected first impedance value as an invalid value when the error rate exceeds the specified threshold value (e.g., 5%), and identify that the accuracy of the corrected first impedance value has decreased. In order to increase the accuracy, the electronic device may update the correction value, based on the first impedance value according to the first measurement posture and the second impedance value according to the second measurement posture, the values being obtained at a time point at which the error rate exceeds the specified threshold value.

In operation 815, the electronic device may identify the corrected first impedance value as the valid value, and may output the corrected first impedance value. As shown in FIG. 10B, since an error rate from a measurement time point of measurement 1 to a measurement time point of measurement 7 does not exceed a threshold, the electronic device may identify that a corrected first impedance value at each measurement time point is a valid value.

According to an embodiment of the disclosure, a method (e.g., an operation method as shown in FIG. 7 and an operation method as shown in FIG. 8) for operation in an electronic device (e.g., the electronic device 101 of FIG. 1 or the electronic device 201 of FIG. 2) may include obtaining a first impedance value, based on a first group of electrodes (e.g., the electrodes 221 and 223 of FIG. 3A) included in an electrode module (e.g., the electrode module 220 of FIG. 2) of the electronic device being in contact with a first portion (e.g., the first portion 410 of FIG. 4A or the second portion 420-1 of FIG. 4B) of a human body, and a first region (e.g., the first region 421 of FIG. 4A or the first region 411-1 of FIG. 4B) of a second portion (e.g., the second portion 420 of FIG. 4A or the first portion 410-1 of FIG. 4B) of the human body being in contact with two electrodes (e.g., the electrodes 222 and 225 of FIGS. 3A to 4C) among a second group of electrodes (e.g., the electrodes 222, 224, and 225 of FIGS. 3A to 4C) included the electrode module according to a first measurement posture (e.g., the first measurement posture of FIG. 4A or 4B) of a user, obtaining a second impedance value, based on the first group of the electrodes being in contact with the first portion of the human body, the first region of the second portion of the human body being in contact with at least one of the two electrodes according to a second measurement posture (e.g., the second measurement posture of FIG. 4C) of the user, and a second region of the second portion being in contact with an electrode other than the two electrodes among the second group of the electrodes, obtaining a correction value, based on the first impedance value or the second impedance value, and storing the correction value in a memory (e.g., the memory 130 of FIG. 1 or the memory 240 of FIG. 2), and obtaining a corrected first impedance value by applying the correction value to the first impedance value.

According to an embodiment of the disclosure, in the method, the first group of the electrodes may include at least two electrodes disposed on one surface of a housing of the electronic device, the second group of the electrodes may include three electrodes disposed on another surface of the housing, and the two electrodes in contact with the first region among the second group of the electrodes may be disposed adjacent to each other on the other surface of the housing.

According to an embodiment of the disclosure, the method may further include obtaining a first impedance value measured at a next measurement time point according to the first measurement posture, and obtaining a corrected first impedance value at the next measurement time point by applying the stored correction value to the first impedance value measured at the next measurement time point.

According to an embodiment of the disclosure, the correction value may be an impedance value related to the second portion, and may be obtained based on a difference between the first impedance value and the second impedance value.

According to an embodiment of the disclosure, the method may further include obtaining an error rate between the corrected first impedance value and the correction value, and identifying the corrected first impedance value as a valid value when the error rate is equal to or less than a specified threshold value.

According to an embodiment of the disclosure, the method may further include identifying the corrected first impedance value as an invalid value, when the error rate exceeds the specified threshold value, and updating the correction value, based on a first impedance value according to the first measurement posture and a second impedance value according to the second measurement posture, the values being obtained at a time point at which the error rate exceeds the specified threshold value.

According to an embodiment of the disclosure, the method may further include displaying the corrected first impedance value on a display module (e.g., the display module 160 of FIG. 1 or the display module 250 of FIG. 2) of the electronic device, and outputting information indicating the corrected first impedance value through an audio module (e.g., the audio module 170 of FIG. 1) of the electronic device.

According to an embodiment of the disclosure, the obtaining of the first impedance value may include identifying the human body contact according to the first measurement posture, based on the first group of the electrodes being in contact with the first portion of the human body, electrically connecting a first switch (e.g., the first switch 521 of FIG. 5) of a measurement module (e.g., the measurement module 230 of FIG. 2) of the electronic device to a first electrode included in the first group, and electrically connecting a second switch (e.g., the second switch 522 of FIG. 5) of the measurement module to a second electrode included in the second group, based on the first region of the second portion of the human body being in contact with the second electrode and a fifth electrode of the second group, electrically connecting a third switch (e.g., the third switch 523 of FIG. 5) of the measurement module to the fifth electrode, and electrically connecting a fourth switch (e.g., the fourth switch 524 of FIG. 5) of the measurement module to the second electrode, applying an input current to the first electrode included in the first group, measuring a current value on a path between the first electrode and the second electrode, and measuring a voltage value on a path between the second electrode and the fifth electrode, and obtaining the first impedance value by using at least one of the measured current value or the measured voltage value.

According to an embodiment of the disclosure, the obtaining of the second impedance value may include identifying the human body contact according to the second measurement posture, based on the first group of the electrodes being in contact with the first portion of the human body, electrically connecting the first switch of the measurement module (e.g., the measurement module 230 of FIG. 2) of the electronic device to the first electrode included in the first group, and electrically connecting the second switch of the measurement module to the second electrode included in the second group, based on the first region of the second portion of the human body being in contact with the second electrode, and the second region being in contact with a fourth electrode of the second group, electrically connecting the third switch of the measurement module to the fourth electrode, and electrically connecting the fourth switch of the measurement module to the second electrode, applying an input current to the first electrode included in the first group, measuring a current value on a path between the first electrode and the second electrode, and measuring a voltage value on a path between the second electrode and the fourth electrode, and obtaining the second impedance value by using at least one of the measured current value or the measured voltage value.

In addition, various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing instructions;
a plurality of electrodes comprising a first group of electrodes and a second group of electrodes, each of the electrodes being configured to be connected to a human body; and
at least one processor including processing circuitry,
wherein the instructions, when executed by the at least one processor individually or collectively, cause the electronic device to:
obtain a first impedance value, based on the first group of the electrodes being in contact with a first portion of the human body, and a first region of a second portion of the human body being in contact with two electrodes among the second group of the electrodes according to a first measurement posture of a user;
obtain a second impedance value, based on the first group of the electrodes being in contact with the first portion of the human body, the first region of the second portion of the human body being in contact with at least one of the two electrodes according to a second measurement posture of the user, and a second region of the second portion being in contact with an electrode other than the two electrodes among the second group of the electrodes;
obtain a correction value, based on the first impedance value and the second impedance value, and store the correction value in the memory; and
obtain a corrected first impedance value by applying the correction value to the first impedance value, and
wherein the correction value is an impedance value related to the second portion, and is obtained based on a difference between the first impedance value and the second impedance value.

2. The electronic device of claim 1,
wherein the first group of the electrodes comprises at least two electrodes disposed on one surface of a housing of the electronic device,
wherein the second group of the electrodes comprises three electrodes disposed on another surface of the housing, and
wherein the two electrodes in contact with the first region among the second group of the electrodes are disposed adjacent to each other on the other surface of the housing.

3. The electronic device of claim 1, wherein the instructions, when executed by the at least one processor individually or collectively, cause the electronic device to:
obtain an error rate between the corrected first impedance value and the correction value; and
identify the corrected first impedance value as a valid value, when the error rate is equal to or less than a specified threshold value.

4. The electronic device of claim 3, wherein the instructions, when executed by the at least one processor individually or collectively, cause the electronic device to:
identify the corrected first impedance value as an invalid value, when the error rate exceeds the specified threshold value; and
update the correction value, based on the first impedance value according to the first measurement posture and the second impedance value according to the second measurement posture, the values being obtained at a time point at which the error rate exceeds the specified threshold value.

5. The electronic device of claim 1, further comprising a display electrically connected to the at least one processor,
wherein the instructions, when executed by the at least one one processor individually or collectively, cause the electronic device to control the display to display the corrected first impedance value.

6. The electronic device of claim 1, further comprising audio circuitry electrically connected to the at least one processor,
wherein the instructions, when executed by the at least one processor individually or collectively, cause the electronic device to control the audio circuitry to output information indicating the corrected first impedance value.

7. The electronic device of claim 1, further comprising measurement circuitry electrically connected to the at least one processor and the plurality of electrodes.

8. The electronic device of claim 7, wherein the instructions, when executed by the at least one processor individually or collectively, cause the electronic device to:
identify contact with the human body according to the first measurement posture;
control the measurement circuitry, based on the first group of the electrodes being in contact with the first portion of the human body, so as to electrically connect a first switch of the measurement circuitry to a first electrode included in the first group, and to electrically connect a second switch of the measurement circuitry to a second electrode included in the second group;
control the measurement circuitry, based on the first region of the second portion of the human body being in contact with the second electrode and a fifth electrode of the second group, so as to electrically connect a third switch of the measurement circuitry to the fifth electrode, and to electrically connect a fourth switch of the measurement circuitry to the second electrode;
control the measurement circuitry so as to apply an input current to the first electrode included in the first group;
measure a current value on a path between the first electrode and the second electrode, and measure a voltage value on a path between the second electrode and the fifth electrode; and
obtain the first impedance value by using at least one of the measured current value or the measured voltage value.

9. The electronic device of claim 7, wherein the instructions, when executed by the at least one processor individually or collectively, cause the electronic device to:
identify contact with the human body according to the second measurement posture;
control the measurement circuitry, based on the first group of the electrodes being in contact with the first portion of the human body, so as to electrically connect a first switch of the measurement circuitry of the electronic device to a first electrode included in the first group, and to electrically connect a second switch of the measurement circuitry to a second electrode included in the second group;
control the measurement circuitry, based on the first region of the second portion of the human body being in contact with the second electrode, and the second region being in contact with a fourth electrode of the second group, so as to electrically connect a third switch of the measurement circuitry to the fourth electrode, and to electrically connect a fourth switch of the measurement circuitry to the second electrode;
control the measurement circuitry so as to apply an input current to the first electrode included in the first group;
measure a current value on a path between the first electrode and the second electrode, and measure a voltage value on a path between the second electrode and the fourth electrode; and
obtain the second impedance value by using at least one of the measured current value or the measured voltage value.

10. A method for operation in an electronic device, the method comprising:
obtaining a first impedance value, based on a first group of electrodes included in a plurality of electrodes of the electronic device being in contact with a first portion of a human body, and a first region of a second portion of the human body being in contact with two electrodes among a second group of electrodes included in the plurality of electrodes according to a first measurement posture of a user;
obtaining a second impedance value, based on the first group of the electrodes being in contact with the first portion of the human body, the first region of the second portion of the human body being in contact with at least one of the two electrodes according to a second measurement posture of the user, and a second region of the second portion being in contact with an electrode other than the two electrodes among the second group of the electrodes;
obtaining a correction value, based on the first impedance value and the second impedance value, and storing the correction value in a memory; and
obtaining a corrected first impedance value by applying the correction value to the first impedance value,
wherein the correction value is an impedance value related to the second portion, and is obtained based on a difference between the first impedance value and the second impedance value.

11. The method of claim 10,
wherein the first group of the electrodes comprises at least two electrodes disposed on one surface of a housing of the electronic device,
wherein the second group of the electrodes comprises three electrodes disposed on another surface of the housing, and
wherein the two electrodes in contact with the first region among the second group of the electrodes are disposed adjacent to each other on the other surface of the housing.

12. The method of claim 10, further comprising:
obtaining an error rate between the corrected first impedance value and the correction value; and
identifying the corrected first impedance value as a valid value, when the error rate is equal to or less than a specified threshold value.

13. The method of claim 12, further comprising:
identifying the corrected first impedance value as an invalid value, when the error rate exceeds the specified threshold value; and
updating the correction value, based on the first impedance value according to the first measurement posture and the second impedance value according to the second measurement posture, the values being obtained at a time point at which the error rate exceeds the specified threshold value.

14. The method of claim 10, further comprising:
displaying the corrected first impedance value on a display of the electronic device; and
outputting information indicating the corrected first impedance value through audio circuitry of the electronic device.

15. The method of claim 10, wherein the obtaining of the first impedance value comprises:
- identifying contact with the human body according to the first measurement posture;
- based on the first group of the electrodes being in contact with the first portion of the human body, electrically connecting a first switch of measurement circuitry of the electronic device to a first electrode included in the first group, and electrically connecting a second switch of the measurement circuitry to a second electrode included in the second group;
- based on the first region of the second portion of the human body being in contact with the second electrode and a fifth electrode of the second group, electrically connecting a third switch of the measurement circuitry to the fifth electrode, and electrically connecting a fourth switch of the measurement circuitry to the second electrode;
- applying an input current to the first electrode included in the first group;
- measuring a current value on a path between the first electrode and the second electrode, and measuring a voltage value on a path between the second electrode and the fifth electrode; and
- obtaining the first impedance value by using at least one of the measured current value or the measured voltage value.

16. The method of claim 10, wherein the obtaining of the second impedance value comprises:
- identifying contact with the human body according to the second measurement posture;
- based on the first group of the electrodes being in contact with the first portion of the human body, electrically connecting a first switch of measurement circuitry of the electronic device to a first electrode included in the first group, and electrically connecting a second switch of the measurement circuitry to a second electrode included in the second group;
- based on the first region of the second portion of the human body being in contact with the second electrode, and the second region being in contact with a fourth electrode of the second group, electrically connecting a third switch of the measurement circuitry to the fourth electrode, and electrically connecting a fourth switch of the measurement circuitry to the second electrode;
- applying an input current to the first electrode included in the first group;
- measuring a current value on a path between the first electrode and the second electrode, and measuring a voltage value on a path between the second electrode and the fourth electrode; and
- obtaining the second impedance value by using at least one of the measured current value or the measured voltage value.

17. An electronic device comprising:
- a first group of electrodes and a second group of electrodes, each of the electrodes being configured to be connected to a human body; and
- at least one processor electrically connected to the electrodes,
- wherein the at least one processor is configured to:
  - obtain a first impedance value, based on the first group of the electrodes being in contact with a first portion of the human body, and a second portion of the human body being in contact with two electrodes of a first combination among the second group of the electrodes according to a first measurement posture of a user,
  - obtain a second impedance value, based on the first group of the electrodes being in contact with the first portion of the human body, and the second portion of the human body being in contact with two electrodes of a second combination of the second group according to a second measurement posture of the user,
  - obtain a correction value, based on the first impedance value and/or the second impedance value, and
  - obtain a bio-signal, based on the first impedance value and/or the second impedance value and the correction value,
- wherein the correction value is an impedance value related to the second portion, and is obtained based on a difference between the first impedance value and the second impedance value.

* * * * *